(No Model.)

A. L. SMITH.
TRIAL FRAME FOR OCULISTS AND OPTICIANS.

No. 404,803. Patented June 4, 1889.

Attest.
Chas. D. Widener
A. S. Smith

Inventor.
Andrew L. Smith,
pr R. F. Osgood,
Atty.

UNITED STATES PATENT OFFICE.

ANDREW L. SMITH, OF GENEVA, NEW YORK, ASSIGNOR TO THE GENEVA OPTICAL COMPANY, OF SAME PLACE.

TRIAL-FRAME FOR OCULISTS AND OPTICIANS.

SPECIFICATION forming part of Letters Patent No. 404,803, dated June 4, 1889.

Application filed September 3, 1887. Serial No. 248,674. (No model.)

*To all whom it may concern:*

Be it known that I, ANDREW L. SMITH, (assignor to the GENEVA OPTICAL COMPANY,) of Geneva, in the county of Ontario and State of New York, have invented a certain new and useful Improvement in Trial-Frames for Oculists and Opticians; and I do hereby declare that the following is a full, clear, and exact description of the same, reference being had to the drawings accompanying this application.

My improvement relates to devices for testing the eyes preparatory to fitting spectacles or eyeglasses thereto, and is designed for oculists' use; and it consists in certain constructions, whereby the frame is fitted and adjusted to the face and nose so as to present the lenses in proper position to the eyes, as will be more fully described.

Figure 1:
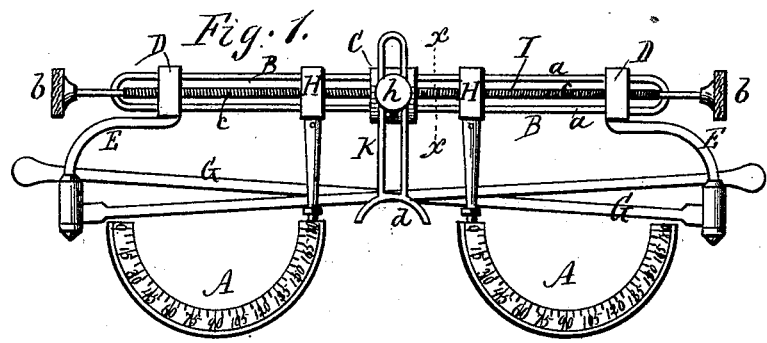
Figure 2:
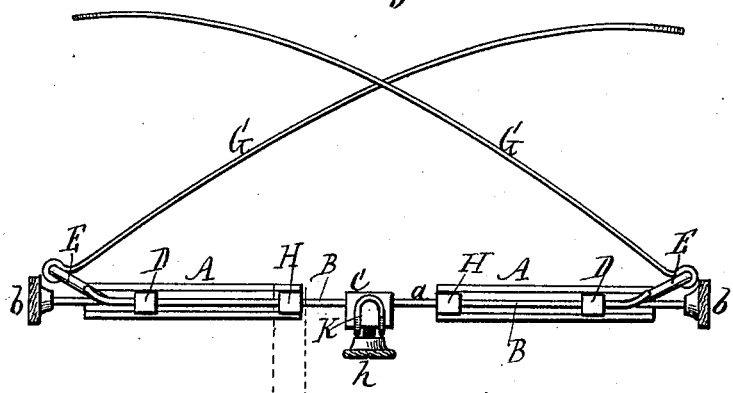
Figure 3:
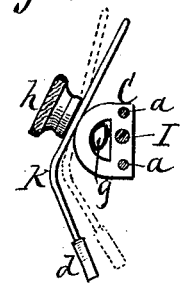
Figure 4:
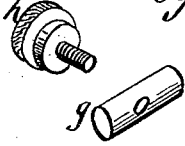

In the drawings, Figure 1 is a front elevation of the device. Fig. 2 is a top view of the same. Fig. 3 is a cross-section in line $x\ x$ of Fig. 1, showing more particularly the arrangement for adjusting the nose-piece. Fig. 4 is a perspective view of the clamp-screw and pin of the nose-piece.

A A indicate the two eye-pieces or sockets for holding the lenses. The testing-lenses are placed in these sockets and are changed from time to time till those of the proper focal power are found. The instrument is fitted to the face like an ordinary pair of spectacles, and the test consists in looking at types or other objects placed at a given distance from the eyes.

B is the frame, consisting of two longitudinal rods or bars $a\ a$, which may be either made in one piece by bending the wire, or made of two or more pieces, as desired. This frame forms the length of the instrument and holds all the working parts. C is a center bearing-block attached fixedly to the frame and forming the bearing for the nose-piece.

D D are end bearing-nuts provided with crank-shaped arms E E, to which the bows G G are attached, and H H are intermediate bearing-nuts, to which the eye-pieces or sockets A A are attached.

I is a long screw-rod which rests between the sides $a\ a$ of the frame B, said screw-rod having milled heads $b\ b$ at the ends by which it is turned. The screw-rod has a plain portion that turns freely in the central bearing-block C without having end movement therein, and on opposite sides of the central bearing-block the screw-rod has right and left threads $c\ c$, as shown in Fig. 1.

The bearings D D and H H act as nuts on the threads, and as the screw is turned in either direction these bearings D H are moved in or out to produce the desired adjustment. The bearing-nuts D H on each side will always keep at the same relative distance apart at whatever adjustment they may be set; consequently the bows G will always preserve the same distance from the eye-pieces A. The object of this part of my invention is to provide a simple and cheap arrangement by which the lenses can be adapted to correspond with the pupillary distance of the eyes. Other devices for the purpose are in use, and a screw-rod located in a case is employed, as in my patent, No. 297,858, April 29, 1884; hence I do not claim a right and left screw for the purpose. The use of the wire frame described makes less cost, and the sides can be located at a greater distance apart than in a tube or case; hence there is less twist and strain, while the device is lighter and less cumbersome. The two parallel rods which constitute the frame also constitute guide-rods on which the lens-frame and bow-frame bearing-nuts slide, and these nuts also in turn insure the rigidity and parallelism of the frame-rods.

The eye-pieces or sockets A A above described are arranged to have a turning action on the axis of their bearings H H, so that they can be turned out at right angles to their natural position to insert or remove the lenses without removing the instrument from the face of the wearer; but this I do not claim.

K is the nose-piece, provided with the usual bridge $d$ to fit on the nose. It is preferably made of wire, as shown, but may be made of sheet metal or other material. The face of the bearing C, against which the nose-piece rests, is circular or segmental to allow the nose-piece to be turned. $g$ is an oscillating shaft which rests and turns in the bearing C, and $h$ is a clamping-screw that screws into the oscillating shaft $g$, and between which and the face of the bearing C the sides of the nose-piece are clamped.

By the arrangement above described the nose-piece can be adjusted up and down, so as to fit noses of different sizes and shapes, and can also be adjusted axially by simply loosening the clamping-screw, turning the nose-piece on its pivot, and then again tightening the clamping-screw. In other words, it can be turned in and out on its center, so as to adjust the sockets, holding the lenses at proper distance from the eyes, and so that they will not come in contact with the eyelashes. The pin $g$ may be made of different form from that described, the only requisite being that it shall serve as the attachment for the clamp-screw, and shall form a pivot or axis by which the turning adjustment can be made. In case the nose-piece is made of wire, as shown in the drawings, the circular face of the bearing C is preferably grooved to receive the side pieces of the nose-frame and hold it in place.

Having described my invention, what I claim as new, and desire to secure by Letters Patent, is—

1. In a trial-frame for oculists, an open frame consisting of two parallel rods, in combination with a central bearing-block through which said parallel rods pass, lens-frame bearing-nuts on each side of said central bearing-block, said nuts sliding on said parallel rods, and a right and left screw-rod parallel with and between said parallel rods and having its bearing in said central bearing-block and engaging with said sliding nuts to operate the same, substantially as set forth.

2. In a trial-frame for oculists, an open frame consisting of two parallel rods, in combination with a central bearing-block C, through which said parallel rods pass, lens-frame bearing-nuts H H on each side of said central bearing-block, and additional end nuts D D on each side of said central bearing-block, all of said nuts sliding on said parallel rods, and a right and left screw-rod parallel with and between said parallel rods having its bearing in said central bearing-block and engaging with said nuts H H and D D, substantially as set forth.

3. In a trial-frame for oculists, the framework thereof and the lens-holders adjustable thereon, in combination with the central bearing-block of said frame-work having its front face circular or segmental in shape, an adjustable nose bridge-piece resting against said circular or segmental face of the central block, an oscillating shaft mounted in said central block, and a clamping screw and nut engaging with said shaft and clamping said nose bridge-piece against the face of said central block, substantially as set forth.

In witness whereof I have hereunto signed my name in the presence of two subscribing witnesses.

ANDREW L. SMITH.

Witnesses:
R. F. OSGOOD,
WM. J. McPHERSON.